US010555625B2

(12) United States Patent
Frank

(10) Patent No.: US 10,555,625 B2
(45) Date of Patent: Feb. 11, 2020

(54) GLASS PANEL ELEMENT WITH A FASTENING ELEMENT AND A GLASS SHOWCASE COMPRISING A GLASS PANEL ELEMENT

(71) Applicants: Wolfgang Frank, Bodenheim (DE); Thomas Matthias Kurz, Bad Kreuznach (DE)

(72) Inventor: Wolfgang Frank, Bodenheim (DE)

(73) Assignees: Wolfgang Frank, Bodenheim (DE); Thomas Matthias Kurz, Bad Kreuznach (DE)

( * ) Notice: Subject to any disclaimer, the term of this patent is extended or adjusted under 35 U.S.C. 154(b) by 0 days.

(21) Appl. No.: 15/317,947

(22) PCT Filed: Jun. 12, 2015

(86) PCT No.: PCT/EP2015/063242
§ 371 (c)(1),
(2) Date: Dec. 11, 2016

(87) PCT Pub. No.: WO2015/189421
PCT Pub. Date: Dec. 17, 2015

(65) Prior Publication Data
US 2017/0119177 A1 May 4, 2017

(30) Foreign Application Priority Data
Jun. 12, 2014 (DE) .................. 10 2014 108 238

(51) Int. Cl.
*A47F 3/12* (2006.01)
*F16B 12/46* (2006.01)
(Continued)

(52) U.S. Cl.
CPC ............ *A47F 3/12* (2013.01); *A47B 47/0075* (2013.01); *A47F 3/005* (2013.01); *B65D 13/02* (2013.01); *F16B 5/0004* (2013.01); *F16B 12/46* (2013.01)

(58) Field of Classification Search
CPC ........ A47F 3/005; A47F 3/12; A47B 47/0075; F16B 5/0004; F16B 12/46; B65D 13/02
(Continued)

(56) References Cited

U.S. PATENT DOCUMENTS 3,633,790 A * 1/1972 Voss ..................... A01K 63/003
220/665
4,948,203 A * 8/1990 Amstutz ................. A47F 3/005
312/140
(Continued)

FOREIGN PATENT DOCUMENTS

DE 2907428 A1 9/1980
DE 29718854 U1 1/1998
(Continued)

*Primary Examiner* — James O Hansen
(74) *Attorney, Agent, or Firm* — Agris & Von Natzmer, LLP; Joyce Von Natzmer

(57) ABSTRACT

The invention relates to a glass panel element (1) with a fastening element (2) for using in a container (6), in particular for using in a showcase. The fastening element (2) has a profiled edge strip (3) for fixing to the container (6) in a form-fitting manner. Said fastening element (2) is adhesively connected with a lateral surface (4) of the glass panel element (1). A thickness (D1) of the fastening element (2) corresponds to a thickness (D2) of the glass panel element (1). A fastening element (2) is arranged on each facing side of the glass panel element (1) and adhesively connected with said glass panel element (1). The profiled edge strip (3) and the glass panel element (1) close in a flush manner. The fastening element (2) is made of aluminium. The invention
(Continued)

Figure 1A:
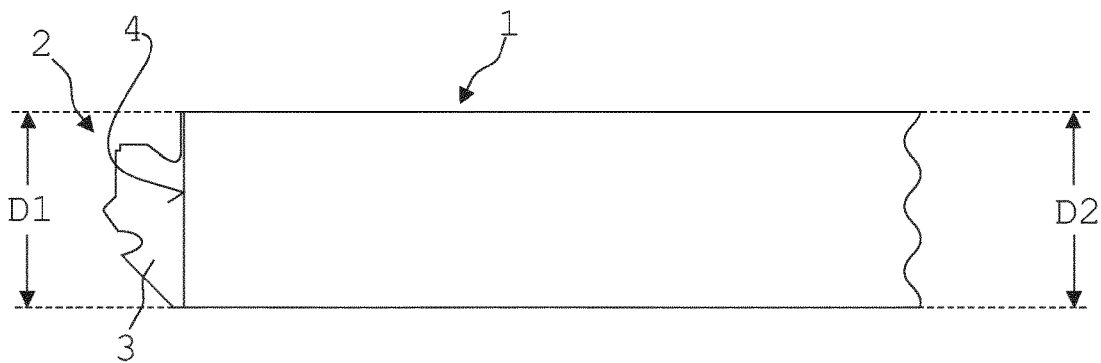

also relates to a glass showcase comprising at least one glass panel element (1) according to the invention.

14 Claims, 4 Drawing Sheets

(51) Int. Cl.
*A47F 3/00* (2006.01)
*A47B 47/00* (2006.01)
*B65D 13/02* (2006.01)
*F16B 5/00* (2006.01)

(58) Field of Classification Search
USPC .................................... 312/114, 138.1, 140
See application file for complete search history.

(56) References Cited

U.S. PATENT DOCUMENTS

| | | | |
|---|---|---|---|
| 6,375,284 B1 * | 4/2002 | Frank | A47B 47/00 312/140 |
| 6,398,322 B1 * | 6/2002 | Chaplin | A47F 3/005 312/114 |
| 7,322,770 B2 | 1/2008 | Frank | |

FOREIGN PATENT DOCUMENTS

| | | |
|---|---|---|
| DE | 10111859 A1 | 6/2002 |
| DE | 102007011968 A1 | 9/2008 |
| DE | 102012104505 A1 | 11/2013 |
| EP | 1330173 B1 | 7/2003 |
| EP | 2666391 A2 | 5/2013 |

\* cited by examiner

GLASS PANEL ELEMENT WITH A FASTENING ELEMENT AND A GLASS SHOWCASE COMPRISING A GLASS PANEL ELEMENT

CROSS-REFERENCE TO RELATED APPLICATIONS

This is the U.S. national stage of International application PCT/EP2015/063242, filed Jun. 12, 2015 designating the United States and claiming priority to German Patent Application DE102014108238.9, filed Jun. 12, 2014.

The invention relates to a glass panel element with a fastening element for using in a container, in particular for using in a showcase, wherein the fastening element comprises a profiled edge strip for fixing in a form-fitting manner to the container.

Such glass panel elements are used, for example, for simply and cost-effectively constructing demountable showcases for exhibitions. For such purpose, the glass panel elements are connected with each other in a form-fitting manner by means of the profiled edge strips and, if necessary, further connection elements fitted to the profiled edge strips.

European Patent EP 1 330 173 B1 for transparent plastic plates describes a form of a profiled edge strip joined to a lateral edge of the plastic plate, said profiled edge strip being able to be positively engaged with a profiled strip shaped connection element also fitted thereto, in order to connect two plastic plates arranged adjacently with each other. Reference is made to the content of said European Patent EP 1 330 173 B1 and in particular to the embodiment of the profiled edge strip described therein. However, it has been demonstrated that such a profiling of the lateral edge of a plastic plate can only be achieved with sufficient precision when a considerable production effort is involved, in order to be able to engage longer edge strip sections with each other by insertion in the assigned connection element. In addition, forming a profiled edge strip is not possible in glass panels.

The fastening elements usually have u-shaped mounting profiles for fixing the fastening elements to the glass panel elements, said mounting profiles encompassing one side of the glass panel element and engaging with the glass panel element in a clamping manner. The use of such mounting profiles for fixing the fastening element to the glass panel element reduces the available transparent surface of the glass panel elements by a width of the mounting profile. In addition, a step is created between the mounting profile and the glass panel element, said step also disturbing the optical overall impression of a showcase composed, for example, of glass panel elements and, furthermore, complicates the cleaning of the glass panel element, as a great deal of dirt is deposited on the step.

The invention is therefore considered to address the problem of developing the known glass panel elements in such a way as to allow aesthetically pleasing, easy-to-clean and cost-effectively producible containers to be assembled, which can be demounted again, if required, and reassembled at another location or for creating another container.

According to the invention, this object is achieved in that the glass panel element and the fastening element are adhesively connected with each other. The adhesive connection concerned can be a force-fit or substance-to-substance connection.

An adhesive connection between the glass panel element and the fastening element can be produced particularly easily and cost-effectively. In addition, this way also allows mounting profiles encompassing certain sections of the glass panel element to be waived, thus retaining a useable, transparent visible surface of the glass panel element.

According to the invention, it is advantageously provided that the fastening element is adhesively connected with a lateral surface of the glass panel element. For this purpose, the fastening element can have a lateral strip arranged on a lateral surface of the glass panel element and adhesively connected with the lateral surface. The result is that none of the mounting elements engaging the glass panel element are needed for fixing the fastening element to the glass panel element, and therefore any optical impairment, for example, of a showcase by the fastening element is particularly small.

According to the invention, it is provided that a thickness of the fastening element corresponds to a thickness of the glass panel element in order to further improve the optical overall impression of the glass panel element and also to simplify any cleaning of the glass panel element. This allows a step between the glass panel element and the fastening element to be avoided. The glass panel element can be engaged surface flush with an external side of the fastening element.

The invention practically provides that a width of the lateral strip of the fastening element corresponds to the thickness of the glass panel element. The result is the availability of a particularly large surface between the fastening element and the glass panel element for establishing the adhesive connection, which allows a particularly permanent connection. For example, the glass panel element can have a thickness of 8 mm. In order to produce an optically appealing, easy-to-clean and as permanent as possible connection of the glass panel element with the fastening element, a width of the lateral strip should equal 8 mm and a thickness of the entire fastening element should not exceed 8 mm.

In a particularly advantageous embodiment of the glass panel element according to the invention it is provided that a thickness of the fastening element is less than a thickness of the glass panel element. This allows, inter alia, to insert corner profiles to be used for connecting two glass panel elements, which are engaged with profiled edge strips of the fastening elements, completely encompassing such fastening elements and closing the transparent surface of the glass panel element in a flush manner. This allows particularly appealing and easy-to-clean containers to be constructed by means of the glass panel elements.

For construction of the container, it is advantageously provided according to the invention that a fastening element is arranged on each facing side of the glass panel element and adhesively connected with the glass panel element.

In order be able to finish the containers, on a surface for example, by a glass panel element as well, the invention provides that a fastening element is arranged on each of at least three sides of the glass panel element and adhesively connected with the glass panel element. This allows the containers to be partially or completely composed of glass panel elements.

In a particularly advantageous configuration of the glass panel element according to the invention it is advantageously provided that the fastening element has a transparent panel element, wherein a panel bottom surface of the panel element and a glass panel element bottom surface of the glass panel element are the same, wherein the profiled edge strip is arranged on a lateral surface of the panel element and wherein said panel element is adhesively connected with a glass panel element surface, and therefore the edge strip laterally projects beyond the glass panel element surface. The result is the availability of a particularly large surface between the fastening element and the glass panel element for establishing the adhesive connection.

A transparent plastic is advantageously used for producing the panel element. The commercially available transparent plastics for producing such panel elements usually have lower resistance to scratching and cleaning agents. Thus, an optical overall impression of a showcase made completely of such a transparent plastic, for example, is impaired after a short time. On the other hand, panel elements made of transparent plastics are particularly easy and cost-effective to produce. An all-over adhesive connection of panel elements made of a transparent plastic with a glass panel thus allows a particularly durable, resistant glass panel element to be cost-effectively produced.

An adhesive that is transparent in its hardened condition is practically used for bonding the fastening element and the glass panel element.

In order to construct showcases by means of glass panel elements using transparent panel elements, for example, an advantageous embodiment of the invention provides that the fastening element has two profiled edge strips, wherein an edge strip is arranged on each facing side of the panel element.

According to the invention, it is provided that the fastening element advantageously has at least three profiled edge strips in order to be able to construct such glass panel elements and, for example, closed containers, using transparent panel elements.

An advantageous embodiment according to the invention provides that the glass panel element has two glass panels with the same glass panel bottom surface, wherein the glass panels are arranged on facing sides of the panel element and adhesively connected with said panel element. This method protects the glass panel element on both visible sides against damage caused by scratching or by cleaning agents, for example.

The optical overall impression of the glass panel element can be improved according to the invention in that the fastening element is made of the transparent plastic. In addition, when using glass panel elements with panel elements, this method allows the panel elements and the profiled edge strips arranged on the panel elements to be simply produced in one piece from the transparent plastic. This makes the glass panel elements particularly cost-effective to produce. Furthermore, additional connection elements between the profiled edge strips and the panel element can be waived, which further increases the durability and lasting nature of the glass panel element.

The panel element and the fastening element are expediently made of acrylic glass.

In order to cost-effectively produce fastening elements, which are adhesively connected with the lateral surface of the glass panel element, the invention provides that the fastening element is made of aluminium. The latter is particularly light and is thus particularly suitable for the production of a permanently adhesive connection with the lateral surface of the glass panel element. In addition, aluminium is particularly stable. The fastening elements can be produced cost-effectively and with great precision in almost any length in an extrusion process.

According to the invention it is provided that the profiled edge strip and the glass panel element terminate in a flush manner.

In order to produce a particularly permanently adherent connection, which also meets the particular optical requirements with regard to the required transparency, the invention provides that an adhesive for establishing an adhesive connection between the fastening element and the glass panel element is a transparent adhesive. In addition, the adhesive can either rapidly harden at room temperature or a rapid hardening of the adhesive can be promoted and achieved by pressure, by a higher temperature or by another suitable stimulation.

The invention also relates to a glass showcase, which according to the invention has at least one glass panel element with a fastening element according to the previously explained features as well as a connection element assigned and fitted thereto, wherein the glass panel element is in detachable form-fit engagement with the connection element. Such glass panel elements, which have the described fastening elements, in conjunction with the assigned connection elements, allow modularly constructed containers to be cost-effectively created, the individual components of which can be assembled or combined rapidly and in only a few steps. No additional tool is required for assembling or disassembling the individual glass panels and for constructing the container.

The individual fastening elements and the connection elements in form-fit engagement therewith can be produced and assembled with very high precision. In many cases a separate sealing of the joints between individual fastening elements and the assigned connection elements is no longer required to reduce an undesired exchange of air between a glass showcase interior and the surroundings thereof to a sufficiently low level.

As the fastening elements and the assigned connection elements are produced separately in large quantities and can be connected with suitable glass panel elements according to individual need, it is basically possible to initially individually produce the required glass panel elements and then establish a subsequent permanent connection with the necessary fastening elements, in order to subsequently assemble the glass showcase onsite out of the prepared glass panel elements by means of the fastening elements connected thereto and the connection elements.

It is also possible in a glass showcase to combine non-transparent lateral walls, floor plates or cover plates with individual glass panel elements according to the invention.

A particularly aesthetically pleasing and charming glass showcase can be produced according to the invention in that a thickness (D3) of the connection element and of the fastening element is less than the thickness (D2) of the glass panel element assigned to the fastening element, when the connection element and the fastening element are engaged with each other. This allows a charmingly filigree connection of the glass panel elements, while only slightly restricting the view of objects exhibited inside the glass showcase.

It is advantageously provided that the fastening elements are in each case arranged on the glass panel elements in such a way that the connection elements and the glass panel elements always terminate in a flush manner with respect to each other on an external side of the glass showcase. According to the invention, the glass panel elements each have mitres in abutment regions of the corner connections established by the fastening elements and the connection elements.

It is basically possible to combine glass panel elements with different thicknesses D2 with each other and connect them by means of the connection elements and fastening elements according to the invention. For example, a glass showcase could have a particularly thick glass panel element on a heavily constrained front side and a thin glass panel element on each of the less constrained side walls.

In a particularly advantageous configuration of the glass showcase according to the invention it is provided that the thickness of the connection element and of the fastening element ranges between 7 mm and 9 mm and preferably equals 8 mm. The thickness of the glass panel elements of conventional glass showcases usually equals 10 mm to 20 mm.

In order to produce a glass showcase that is enclosed from all sides but is transparent and optically appealing from all sides and at least from above as well as, if necessary, from below, it may be provided that a floor element or cover element comprising a glass panel element with a suitable fixing element is used, wherein the fastening element has a stop surface for laying on a side wall element of the glass showcase. The floor element or cover element can be laid on a floor side or cover side of the glass showcase for closure and, if necessary, fixed to the adjacent lateral wall elements with a suitable soluble fixing agent. The fixing agent can, for example, be a soluble adhesive. It is also possible that the fixing agents contains clamps or clamping bolts, which are advantageously arranged in the area of the fastening elements or of the connection elements and allow a force-fit fixing of the floor element or of the cover element to the side wall elements of the glass showcase.

In order to be able to assemble a large-scale glass showcase out of a plurality of small-scale glass panel elements, at least one connection element of the glass showcase according to the invention has a profiled rail with profiled strips arranged on two opposing sides, and therefore the profiled rail allows a form-fit engagement of assigned fastening elements of two glass panel elements arranged in a flush manner with respect to each other. It is also possible to provide t-shaped or cross-shaped connection elements, in order to be able to modularly assemble complexly shaped glass showcases out of a plurality of glass panel elements.

Advantageous configurations of the glass panel element according to the invention with assigned fastening elements and connection elements are explained in more detail by way of example on the basis of exemplary embodiments illustrated in the drawings.

Figure 1B:
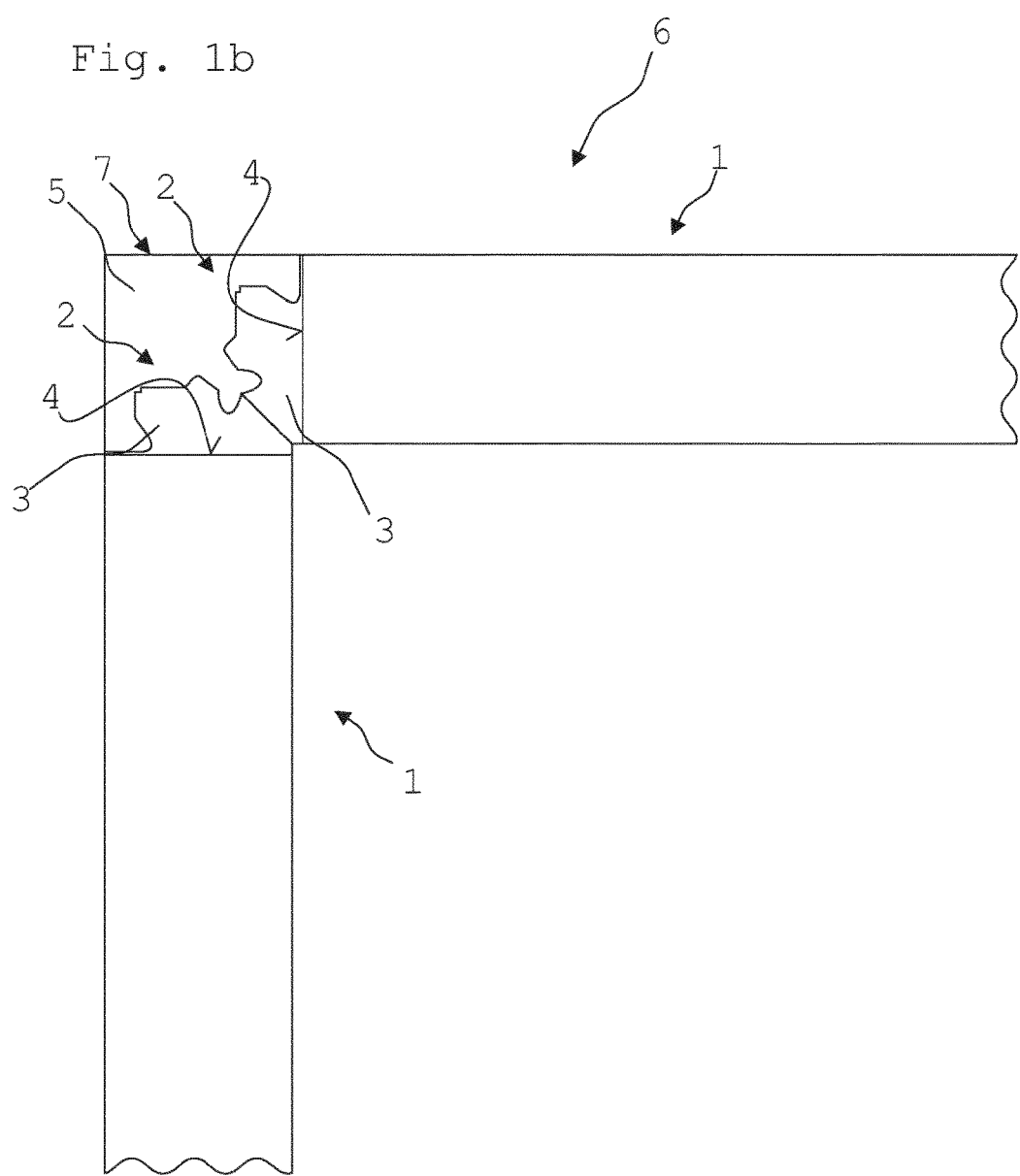
Figure 2A:
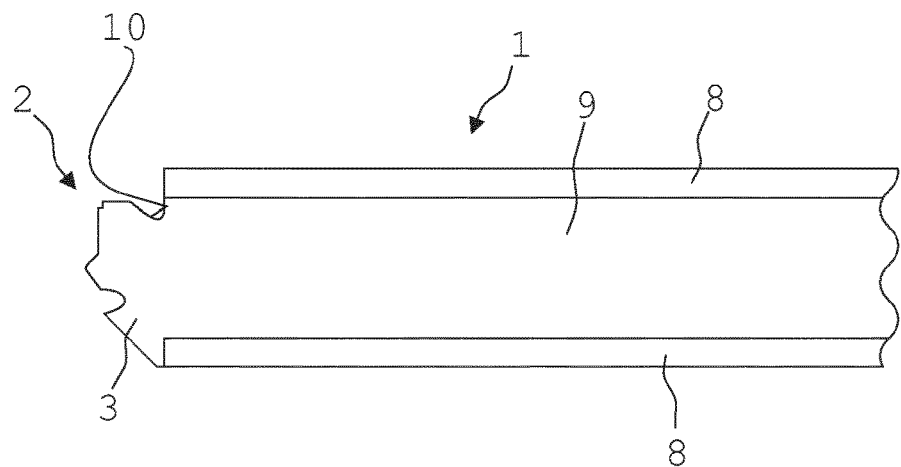
Figure 2B:
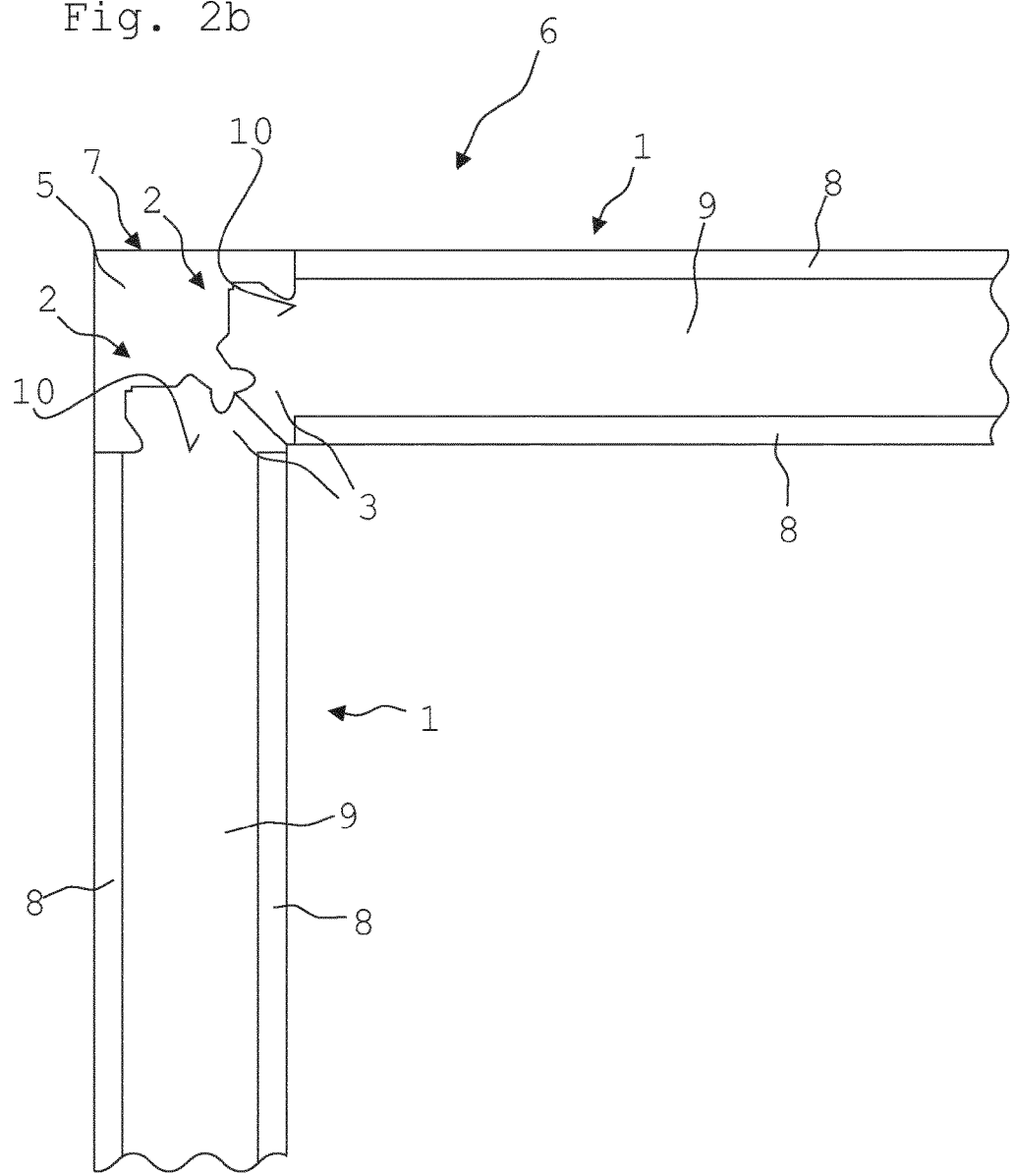
Figure 3:
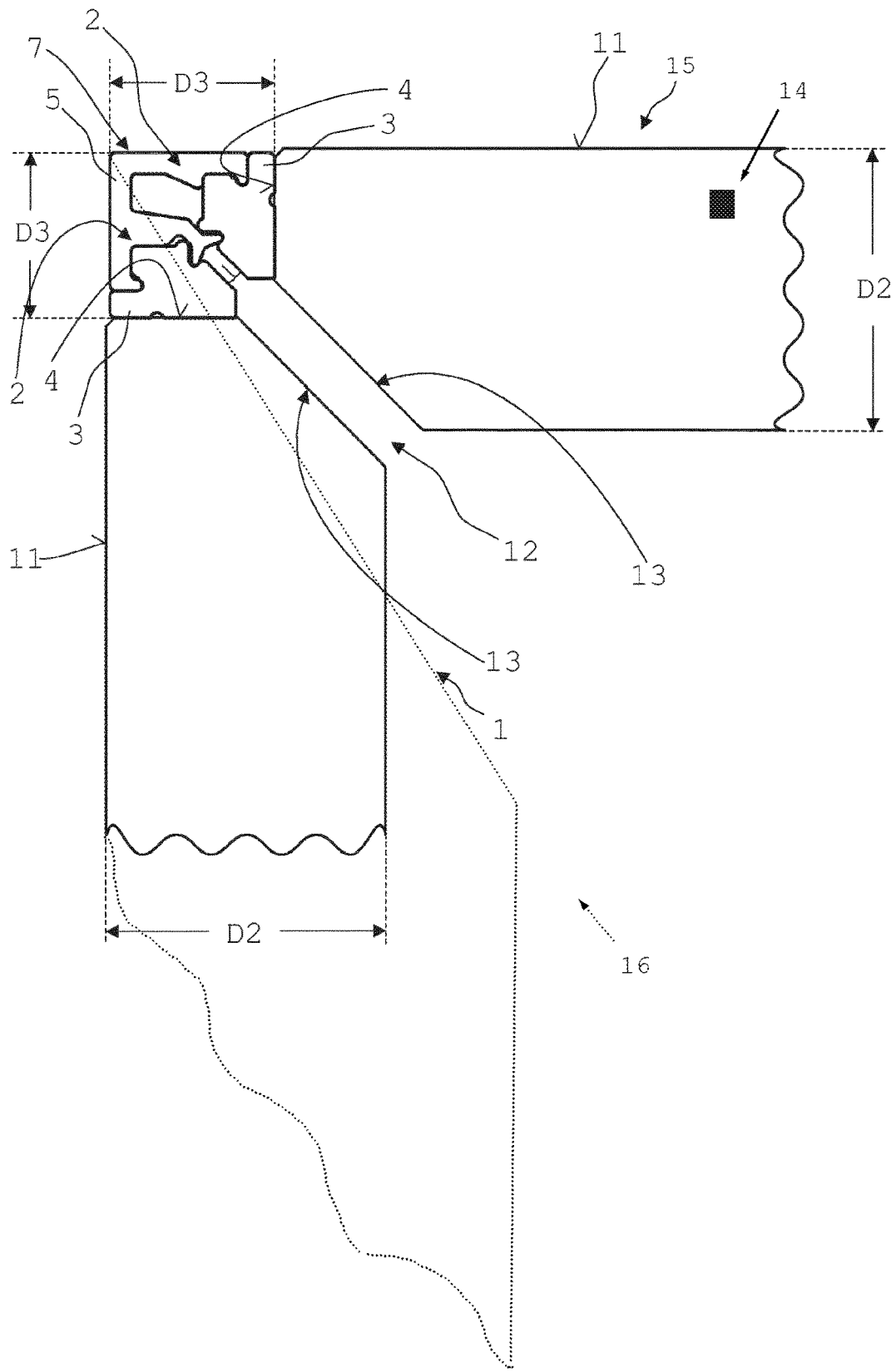

The figures show in:

FIG. 1a a schematically-illustrated diagram of a glass panel element with a fastening element, wherein the fastening element is adhesively connected with a lateral surface of the glass panel element, FIG. 1b a schematic illustration of the glass panel element shown in FIG. 1a, wherein the glass panel element is connected with a further glass panel element in a form-fitting manner via a profiled rail, FIG. 2a a schematic illustration of a glass panel element, wherein the fastening element has a panel element, FIG. 2b the glass panel element schematically illustrated in FIG. 2a, wherein the glass panel element is connected to a further glass panel element in a form-fitting manner via a profiled strip and FIG. 3 schematically illustrated glass panel elements of a glass showcase wherein a thickness of the fastening elements and of the connection elements is in each case smaller than the thickness of the glass panel elements.

FIG. 1a shows a schematic illustration of a glass panel element 1 with a fastening element 2, wherein the fastening element 2 has a profiled edge strip 3 and is adhesively connected to a lateral surface 4 of the glass panel element 1.

A thickness D1 of the fastening element 2 corresponds to a thickness D2 of the glass panel element 1. The fastening element 2 is made of aluminium.

FIG. 1b shows details of two of the glass panel elements 1 illustrated in FIG. 1a with the fastening elements 2 adhesively arranged on the respective lateral surfaces 4, wherein the profiled edge strip 3 of the fastening elements 2 are each positively engaged with a profiled rail 5. The glass panel elements 1 are connected with further glass panel elements 1 (not shown) and form a glass showcase 6. The profiled rail 5 forms a connection element 7 for connecting two adjacently arranged glass panel elements 1 with each other, wherein each of the fastening elements 2 assigned to one another are engaged with the profiled rail 5 in a form-fit manner and can only be detached from each other again by pulling them apart in the longitudinal direction of the profiled rail 5.

FIG. 2a shows a schematic illustration of a glass panel element 1, wherein the glass panel element 1 has two glass panels 8. Said glass panels 8 are adhesively connected to a panel element 9 made of a transparent plastic. The profiled edge strip 3 of the fastening element 2, comprising the profiled edge strip 3 and the panel element 8, is arranged on a lateral surface 10 of the panel element 9 and also made of transparent plastic. The profiled edge strip 3 and the panel element 9 are produced in one piece.

The glass panel bottom surfaces or the visible surfaces of the glass panels 8 correspond to a panel bottom surface or to the surface of the panel element 9 adhesively connected with the glass panels 8.

FIG. 2b shows sectional details of two of the glass panel elements 1 shown in FIG. 1a with panel elements 9 adhesively connected with the glass panels 8 of the glass panel elements 1 and profiled edge strips 3 configured on the lateral surfaces 10 of the panel elements 9. The profiled edge strips 3 of the fastening elements 2 are positively engaged with the profiled rail 5 and form a transparent container 11. Said transparent container 11 can be a container 6 (shown in part).

Figure 4:
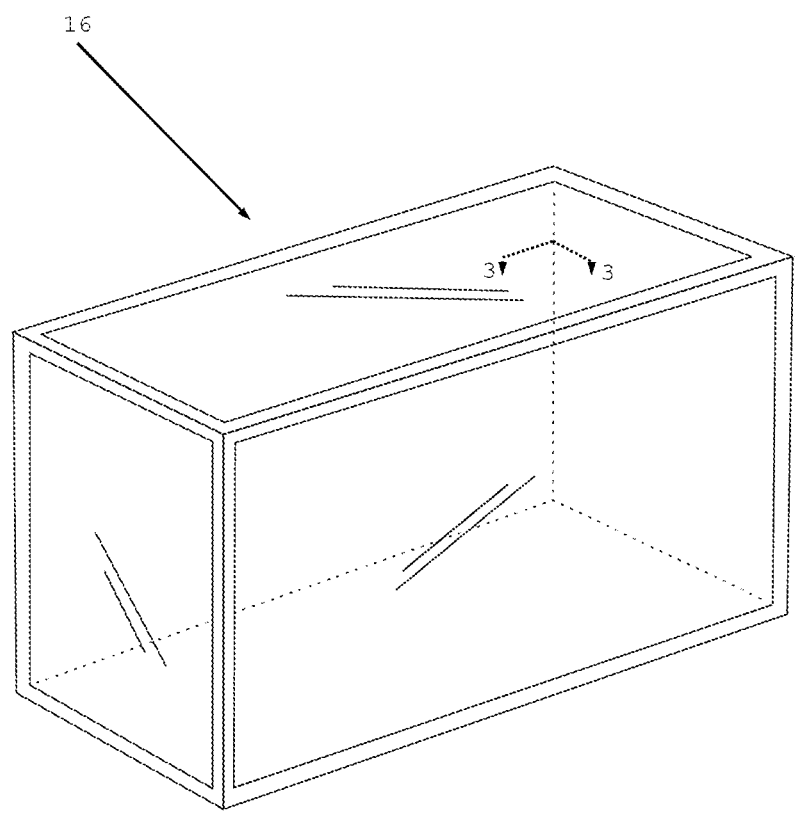

FIG. 3 shows details of FIG. 4, namely a schematic diagram of two glass panel elements 1 with the fastening elements 2 adhesively arranged on each of the lateral surfaces 4. The profiled edge strips 3 of the fastening elements 2 are each positively engaged with a profiled rail 5.

FIG. 4 shown a glass showcase 16 in which the glass panels are attached to each other as shown in detail in FIG. 3.

A thickness D3 of the connection element 5 and of the fastening elements 2 is less than the thicknesses D2 of the glass panel element 1 assigned to each fastening element 2. Said fastening elements 2 are each arranged on the glass panel elements 1 in such a way that the connection element 7 formed by the profiled rail 5 and the glass panel elements 1 each terminate in a flush manner with respect to each other on an external side 11 of a glass showcase 16 formed by the glass panel elements 1 with further glass panel elements (not shown). The glass panel elements 1 each have miters 13 in an abutment region 12. The glass panel elements 1 in the abutment region 12 of the diagram are arranged at intervals to each other. However, according to the invention it is also possible and provided that the glass panel elements 1 abut each other in the abutment region 12.

The thicknesses D2 of the glass panel elements 1 assigned to the respective fastening element 2 can vary in size, and therefore the connection element 5 and the fastening elements 2 allow two glass panel elements 1 to be connected with each other diagonally, which can have diverging thicknesses D2(1) and D2(2). The two glass panel elements 1 connected with each other diagonally each expediently have a suitable miter 13 in the abutment region 12.

In the event of a glass showcase 16 formed out of a plurality of glass panel elements connected with each other, it is also possible to use different glass panel elements 1, each with diverging thicknesses D2, on a plurality of sides or all sides. As the fastening elements 2 are suitable and can be used for glass panel elements 1 with differing, or almost any thickness D2, glass panel elements 1 of varying thicknesses can be combined with each other with the same connection elements 5 and fastening elements 2 and assembled into complex showcase systems.

The invention claimed is:

1. Glass panel element attached to one or more profiled edge strips of one or more fastening elements adapted for use in a container wherein the glass panel element has two parallel panel surfaces having a width providing a transparent viewing surface and, perpendicular thereto, at least one lateral surface having a width, wherein the width of the at least one lateral surface is less that the width of the parallel panel surfaces, the one or more profiled edge strips each comprising:

a first surface flush abutting the at least one lateral surface of the glass panel element, and, a first and second side surface, wherein at least one of side surfaces comprises a recess configured to form-fittingly engage a connection element and wherein a distance between the first and second side surface defines a first thickness and wherein the first surface flush abutting the lateral surface of the glass panel element is adhesively connected via an adhesive connection with the lateral surface of the glass panel element, wherein the distance between the two parallel panel surfaces of the glass panel element defines a second thickness, and wherein the first thickness of the one or more profiled edge strips is less than the second thickness of the glass panel element.

2. The glass panel element attached to the one or more fastening elements according to claim 1, wherein the container is a glass showcase.

3. Glass showcase comprising:

the at least one glass panel element and the one or more fastening elements according to claim 2, wherein at least a first of the one or more profiled edge strip of the one or more fastening element is attached to a first lateral surface of the glass panel element, and the connection element assigned and fitted to the profile of the first profiled edge strip and to a profile of a second profiled edge strip, wherein the at least one glass panel element is in detachable form-fit engagement with the connection element via the profile of the first profiled edge strip and the profile of the second profiled edge strip to form a connection.

4. The glass showcase according to claim 3 comprising a first and a second glass panel element attached to each other via the first profiled edge strip attached to the lateral surface of the first glass panel element and the second profiled edge strip attached to the lateral surface of the second glass panel element, and wherein the connection element assigned and fitted to the profile of the profiled edge strips of the first and second profiled edge strip provides an engagement with the first and second profiled edge strip, wherein the first and second glass panel element are in the detachable form-fit engagement with the connection element via the profile of the first profiled edge strip and the profile of the second profiled edge strip to form the connection attaching the first glass panel element to the second glass panel element.

5. The glass showcase according to claim 4, wherein the connection defines a third thickness, defined by a thickness of the surface of the connection element facing away from the engagement with the profile of the profiled edge strip of the first fastening element and the profile of the profiled edge strip of the second fastening element, and a distance to the glass panel element occupied by the second or first fastening element when the connection element and the fastening element are engaged with each other is less than the second thickness of the first or second glass panel element.

6. The glass showcase according to claim 5, wherein the thickness of the connection element and of the fastening element ranges between 7 mm and 9 mm or is 8 mm.

7. The glass showcase according to claim 4, wherein the first and second glass panel elements each comprise a first and second abutment region extending between the parallel panel surface and at least one lateral surface of the first and second glass panel element, wherein the first and second abutment region face each other.

8. The glass showcase according to claim 3 comprising two glass panel elements, the thickness of which differ and which are each positively engaged with the connection element via one of the one or more fastening elements.

9. The glass panel element attached to the one or more profiled edge strips according to claim 1 comprising at least two profiled edge strips, wherein each of the at least two profiled edge strips is arranged on opposing lateral surfaces of the glass panel element.

10. The glass panel element attached to the one or more fastening elements according to claim 1, wherein the fastening element is made of aluminum.

11. The glass panel element attached to the one or more profiled edge strips according to claim 1, wherein an adhesive for establishing the adhesive connection between the one or more profiled edge strips and the glass panel element is a transparent adhesive.

12. The glass panel element of claim 1, further comprising an abutment region that extents between one of the parallel panel surfaces and the at least one lateral surface.

13. The glass panel element of claim 12, wherein the abutment region is located at a first panel surface of the two panel surfaces of the glass panel element and the recess of the profiled edge strip are at a second panel surface of the two panel surfaces of the glass panel element.

14. The glass panel element of claim 1, wherein the glass panel element is free of recesses.

* * * * *